US007550106B2

(12) United States Patent
Toncelli

(10) Patent No.: US 7,550,106 B2
(45) Date of Patent: Jun. 23, 2009

(54) PROCESS FOR THE MANUFACTURE OF SLABS AND PANELS OF CERAMIC MATERIAL

(76) Inventor: Marcello Toncelli, Bassano del Grappa (Vicenza) (IT); Luca Toncelli, legal representative, Viale Asiago 34 - 36061, Bassano del Grappa (Vicenza) (IT); Maria Luisa Salvalaggio, legal representative, Via Papa Giovanni XXIII 2 - 36061, Bassano del Grappa (Vicenza) (IT); Dario Toncelli, legal representative, Via San Pancrazio 3 - 36061, Bassano del Grappa (Vicenza) (IT)

( * ) Notice: Subject to any disclaimer, the term of this patent is extended or adjusted under 35 U.S.C. 154(b) by 144 days.

(21) Appl. No.: 11/053,827

(22) Filed: Feb. 9, 2005

(65) Prior Publication Data

US 2005/0147806 A1 Jul. 7, 2005

Related U.S. Application Data

(63) Continuation of application No. PCT/IT02/00566, filed on Sep. 4, 2002.

(51) Int. Cl.
*B28B 1/087* (2006.01)
(52) U.S. Cl. .......................... 264/640; 264/71; 264/642
(58) Field of Classification Search .................. 264/71, 264/640, 642
See application file for complete search history.

(56) References Cited

U.S. PATENT DOCUMENTS 3,041,205 A 6/1962 Iler
4,524,039 A * 6/1985 Bevan .......................... 264/71
5,045,385 A * 9/1991 Luckanuck .................. 428/220
5,264,168 A * 11/1993 Toncelli ...................... 264/658
5,670,007 A * 9/1997 Toncelli ...................... 156/257
5,800,752 A * 9/1998 Charlebois .................. 264/71

FOREIGN PATENT DOCUMENTS

EP 378275 A2 * 7/1990
WO WO 01/17741 3/2001

OTHER PUBLICATIONS

International Search Report dated May 13, 2003.
International Preliminary Examination Report dated Dec. 1, 2004.

* cited by examiner

*Primary Examiner*—Steven P Griffin
*Assistant Examiner*—Russell J Kemmerle, III
(74) *Attorney, Agent, or Firm*—Katten Muchin Rosenman LLP

(57) ABSTRACT

In the manufacture of slabs and panels of ceramic material according to the vacuum vibrocompaction method described in Italian patent 1,311,858, the initial mix is formed using ceramic having the form of sands having a grain size of less than 2.5 mm, preferably less than 1 mm, and ceramic powders, together with a binding additive in the form of an aqueous solution consisting of sodium silicate in a concentration greater than 24° Baumé, fibers of high-melting transparent inorganic material, preferably high-melting glass, also being added to the mix.

The slabs obtained have an improved mechanical strength, a reduced porosity and improved aesthetic properties, in addition to being free from cracks and microscopic fissures.

12 Claims, No Drawings

PROCESS FOR THE MANUFACTURE OF SLABS AND PANELS OF CERAMIC MATERIAL

CROSS-REFERENCE TO RELATED APPLICATION

This application is a continuation of International Application Number PCT/IT2002/000566, which was filed on Sep. 4, 2002, the contents of which are herein wholly incorporated by reference.

The present invention relates to a process for the manufacture of ceramic slabs and the resultant product.

Ceramic slabs are already known and manufactured under the tradename Lapitech. They are produced using a vacuum vibrocompaction method which differs from the conventional technology used in the ceramics sector in which the formation of slabs and panels is normally obtained by means of the sole action of the pressure applied by means of presses which must generate very high pressures, which explains why in conventional technology there exist limits as regards the size—actually quite limited—of the slabs or panels which can be made.

The Lapitech process forms the subject of Italian patent No. 1,311,858 and envisages, in order to manufacture slabs of ceramic material, the preparation of a mix consisting of a granulate, preferably having the form of sand, obtained from the granulation of natural or ceramic stone materials (also referred in the technical jargon as "chamottes" or "prebakes"), and a binding phase consisting of ceramic powders which are mixed with a water-based inorganic binder so as to impart a sufficient mobility.

With particular reference to the composition of the starting mix, it must be pointed out that:

the granulate (having a maximum grain size not less than 2.5 mm) may be composed of natural materials such as feldspar, porphyry, granite, syenites, basalt, but, as clarified below, their use gives rise to problems and it is preferred to use ceramic materials, such as porcelain and grès;

the binding phase consists of ceramic powders and a refractory binder where:

(i) the ceramic powders (having a grain size of less than 0.04 mm) are feldspar, nepheline, syenites mixed with clays and/or kaolin, and mixtures obtained from the same with the addition also of other ingredients. These powders, after final baking, form the continuous ceramic matrix of the final slab.

(ii) The refractory binder preferably consists of sodium silicate (soluble glass) in the form of an aqueous solution or optionally other types of refractory binders and is introduced during the drying stage.

Usually, during the today's practical realization of this process, only ceramics having the form of sands are used, since granules of natural material pose difficulties in that they are not stable at high temperatures, making it practically impossible to manufacture the product: the variation in their dimensions or their fusion during the thermal cycle give rise to microscopic cracks or pittings in the product.

Therefore prebaked ceramics having the form of sands are used in quantities such as to stabilize sufficiently the product, namely to avoid an excessive shrinkage that might result in fissures, said quantities forming approximately about 60% of the final composition.

The binding additive, which usually consists—as already mentioned—of an aqueous solution of sodium silicate, must be added in quantities such as to be able to saturate the interstices present between the powders.

The process for the manufacture of slabs or panels envisages a forming step, where the mix is vibrated, applying at the same time a pressure onto the mix by means of the ram of a press and producing a certain vacuum.

The product thus obtained is firstly dried and then baked at a high temperature, resulting in a slab having the characteristics typical of ceramic materials. In particular it has a low water absorption of the order of 0.30-0.35% by weight.

During the drying stage the water, contained in the sodium silicate, evaporates so that the product undergoes a linear shrinkage of about 1.1%. During the subsequent baking step, a linear shrinkage of about 5-6% occurs, which means an overall shrinkage value of about 18% in volume.

During the drying stage, the particles forming the ceramic powders, owing to the action of the sodium silicate, are bonded together, making the dried slab rigid and strong to such an extent that it can be handled; the granules forming the prebake move instead towards each other, but it is of fundamental importance that they do not mutually come into contact because this event would prevent a further shrinkage of the product with the consequent formation of cracks.

Hitherto, in order to avoid the undesirable phenomenon of fissures during the drying step, the prebaked granulate must have a grain-size scale, the maximum value of which must preferably be greater than 3 mm, even though values of 2.5 mm are nevertheless acceptable.

On the contrary, with maximum grain sizes of less than 2-2.5 mm, the product would crack.

According to a plausible explanation, the ceramic granulate has the effect of stabilising the product while it is drying, but a reduction in the grain size below the mentioned values would give rise to cracks in the drying product.

In order to avoid this problem it was thought to add fibres to the mix, so as to reinforce and stabilise it, thus avoiding cracks during drying. The percentage of prebake in the final composition may thus be reduced to values of even less than 60% by weight.

The fibres perform their function of reinforcing the mix during the drying process and consequently during the initial shrinkage; as the mix loses water the inorganic binder performs it binding function so that, at the end of the drying step, the slabs have a remarkable consistency which is then maintained during the baking step in roller furnaces (up to about 1200° C.) in view of the refractory nature of the binder. Firstly it was thought to use organic fibres which, at the beginning of the baking step (about 400° C.), owing to the heat, burn and therefore disappear; said fibres, however, have the drawback that they generate small cavities in the material which, on a superficial level, result in aesthetic defects which are clearly visible.

In order to overcome this drawback, it was also thought to prepare two mixes both with the same composition in order to create two layers, one arranged on top of the other one, where organic fibres were added to the bottom layer, while the upper layer was devoid of them. Obviously, the bottom layer was intended to form the non-visible surface of the final slab (since it had defects on its surface), while the upper layer, being free from defects, was intended to form the visible surface of the resulting slab. This therefore resulted in a composite product in which the bottom layer acted as a support for the upper layer (during the drying stage), avoiding the risk of cracks occurring.

Obviously the corresponding industrial process was more complex and the final slab was subject to a possible lack of uniformity in its mechanical properties.

The use of inorganic fibres, such as glass fibres, was subsequently adopted. However, even when using normal glass fibres, during the drying step they perform the reinforcing function to avoid the formation of cracks, but they melt during the subsequent baking, thus creating visible cavities which result in defects.

In turn the use of ceramic having the form of sands with the grain size referred to above, i.e. normally greater than 2.5 mm, gives rise to the following drawbacks:

the large granules of the ceramic having the form of sands can be clearly seen in the end product and this has a negative effect on the aesthetic appearance;

it is not possible to create veined effects;

the chemical bond which is formed between the powder matrix and the granules of ceramic having the form of sands is not very strong in view of the lack of complete compatibility, so that the mechanical strength, although it is satisfactory, is not too high, reaching only values of the flexural-tensile strength of 20-25 N/mm$^2$.

In order to obtain a pleasing aesthetic effect, while retaining this grain size, it would therefore be necessary to use sands having the same colour as the matrix; however, in this case, whenever it is required to vary this aspect, it would be necessary to use differently coloured sands with the consequence, on the one hand, of modifications to the sand production process and, on the other hand, of an increased complexity of the manufacturing plant.

However, even when using sands having the same colour as the powder matrix, the granules would still be noticeable.

If the grain size were to be reduced, the visual impact of the sands would be greatly reduced, so that it would be possible to use sands with a single colour—(semitransparent) translucent white—and provide the final colouring by adding coloured pigments to the mix depending on the desired effect. However, hitherto this has not been feasible owing to the already mentioned appearance of fissures in the slab.

Moreover, if fine sands were used, the mechanical strength of the product would be increased considerably.

The main object of the present invention is to solve in an industrially advantageous manner the abovementioned problems and drawbacks and in particular to manufacture, using the vacuum vibrocompaction method of the type indicated above, slabs of ceramic material, also of considerable size and possibly of limited thickness, from prebaked ceramic powders and ceramics having the form of sands, with a reduced content of the latter, in particular not greater than 60-65% by volume of the final product and in which moreover the grain size of the ceramic having the form of sands is substantially reduced to values considerably less than 2.5 mm.

A particular object of the present invention is that of manufacturing slabs of the abovementioned type using the ceramic powders indicated above, so that on the one hand the aesthetic characteristics of the resultant product are improved and on the other hand not only do no cracks or fissures occur in the slab material produced, but also the mechanical strength of the resultant material is increased considerably.

These and other objects are achieved with the process according to the present invention for the manufacture of slabs of ceramic material, of the type in which a mix is prepared consisting of ceramic material having the form of sand, in a quantity not greater than 60% by volume of the dried product, and a binding phase consisting of ceramic powders as previously defined and of sodium silicate in form of an aqueous solution as an additive, which mix is subjected to a vacuum vibrocompacting action, preferably of the type described in Italian patent No. 1,311,858, prior to a drying phase and a baking phase, characterized in that:

said ceramic having the form of sand has a grain size less than 2.5 mm, preferably less than 1 mm, even more preferably between 0.3 and 0.5 mm;

said aqueous solution of sodium silicate has a concentration greater than 24° Baumé, preferably 36° Baumé, and in that high-melting inorganic transparent fibres, preferably high-melting glass fibres, are added to said mix.

In a preferred embodiment of the present invention said high-melting glass fibres have a length of between 3 and 14 mm and are added to the starting mix in an amount equivalent to about 2% by volume.

According to an alternative embodiment, aimed at manufacturing a slab with the abovementioned characteristics which also has collapse-resistant properties, said slab is manufactured by distributing in succession inside the forming mould two layers of mix of the above defined composition and placing, between the two layers of material, with a random arrangement, wires (approximately 20 mm long and with a diameter of about 0.6 mm) made of stainless steel (optionally nickel-plated) or of metal alloys which do not oxidise at high baking temperatures (for example Inconel alloy). Alternatively it is possible to use a collapse-resistant meshwork made with the same type of material.

In the above definition the term "high-melting fibre" is understood as being a refractory inorganic fibre which, at the temperatures used for baking the product supplied from the drying stage, does not melt but at the most undergoes softening, so that it cannot give rise to the abovementioned aesthetically unpleasing effects. Moreover an inorganic fibre with these characteristics does not prevent the product from shrinking during the drying step.

A high-melting glass fibre (with zirconium oxide), commercially available under the name "Cemfil" has proved to be particularly advantageous for the present invention.

As regards the aqueous solution of sodium silicate, according to the present invention it was found that particularly advantageous results are obtained when the concentration of the sodium silicate is 36° Baumé.

Concentrations greater than 48° Baumé are even more advantageous in terms of binding action during the drying stage, but in this case the duration of drying is extended considerably.

Finally, it is to remark that a smaller size of the ceramic having the form of sands in the starting mix increases the adhesion thereof to the ceramic powders (intended to form the continuous ceramic matrix) and consequently there is an increase in the mechanical strength of the product which reaches values of 40 N/mm$^2$ in the flexural-tensile breakage tests.

In addition the considerable decrease in grain size of the ceramic having the form of sands (which in the preferred embodiment are reduced from values of more than 2.5 mm to values of 0.3-0.5 mm) not only results in substantial improvements in terms of visual effect, in the sense of preventing visibility of the individual granules on the surface, but also allows a veined effect to be obtained which is very similar to that of natural materials.

According to the present invention, the slabs of ceramic material are therefore characterized by an improved aesthetic appearance, both due to the lack of surface defects and because the granules of ceramic having the form of sands are not noticeable, but on the contrary a veined effect is obtained.

They are moreover characterized by an improved mechanical strength which reaches values as high as 40 N/mm$^2$ in the flexural-tensile breakage tests.

Another important property of the slabs according to the present invention is that of their diminished porosity; they in fact have a water absorption of about 0.10% by weight.

Finally it will not be forgotten that these slabs may be made in large sizes which are particularly useful for floorings and wall cladding; in the latter case it is also possible to combine a collapse-resistant effect which, in the case of extraordinary events (such as earthquakes), prevents breakage of the slabs into numerous fragments which become detached from the wall and fall to the ground.

Two embodiments of the present invention are now provided by way of a non-limiting example:

EXAMPLE 1

Volumetric Formulation for a Mix with a Sand/Powder Ratio 60/40:

| | |
|---|---|
| Sodium silicate 36° Baumé | 22.8% |
| Mixture of ceramic powders | 30.0% |
| Ceramic having the form of sand (grain size 0-0.6 mm) | 45.2% |
| "Cemfil" fibre | 2.0% |

EXAMPLE 2

Volumetric Formulation for a Mix with a Sand/Powder Ratio 50/50:

| | |
|---|---|
| Sodium silicate 36° Baumé | 26.5% |
| Mixture of ceramic powders | 35.8% |
| Ceramic having the form of sand (grain size 0-0.6 mm) | 45.2% |
| "Cemfil" fibre | 2.0% |

The invention has been described in relation to preferred embodiments, it being understood that conceptually equivalent modifications and variations are possible and fall within the scope of the appended claims.

For example, as already mentioned, in place of an aqueous solution of sodium silicate, other refractory binders, also in the form of an aqueous solution, may be used.

The invention claimed is:

1. A method of manufacturing one of a ceramic slab and a panel, the method comprising the steps of:
   preparing a mix comprising a ceramic material and a binding phase,
      wherein the ceramic material comprises sand in a quantity not greater than 60% by dried volume of the mix and the sand comprises a grain size of less than 2.5 mm, and
      wherein the binding phase comprises a ceramic powder and an additive comprising sodium silicate in the form of an aqueous solution;
   adding high-melting transparent inorganic fibers to the mix, wherein the high-melting transparent inorganic fibers comprise a quantity of at least 1.1% by dried volume of the mix;
   vacuum vibrocompacting the mix;
   drying and baking the mix.

2. The method of claim 1, wherein the sand comprises a grain size of less than 1 mm.

3. The method of claim 1, wherein the sand comprises a grain size of between 0.3 and 0.5 mm.

4. The method of claim 1, wherein the sand comprises sand of a prebaked type.

5. The method of claim 1, wherein the aqueous solution of sodium silicate comprises a concentration greater than 24° Baumé.

6. The method of claim 5, wherein the aqueous solution of sodium silicate comprises a concentration of 36° Baumé.

7. The method of claim 1, wherein the high-melting transparent inorganic fibers comprise high-melting glass fibers.

8. The method of claim 7, wherein the high-melting glass fibers comprise a length of between 3 and 14 mm, and
   wherein the step of adding the high-melting transparent inorganic fibers is performed such that high-melting transparent inorganic fibers are added in a quantity of about 2% by dried volume of mix.

9. The method of claim 1, wherein before the step of vacuum vibrocompacting the mix, the following steps are performed to have collapse-resistant properties in the one of the ceramic slab and the panel:
   depositing a first layer of the mix inside a forming mould;
   placing wires in a random arrangement on the first layer, wherein the wires comprise one of a stainless steel and a metal alloy that at the high baking temperatures do not oxidize; and
   depositing a second layer of the mix inside the forming mould on the wires and the first layer.

10. The method of claim 9, wherein the wires comprise a length of about 20 mm and a diameter of about 0.6 mm.

11. The method of claim 10, wherein the wires comprise nickel-plated stainless steel.

12. A method of manufacturing one of a ceramic slab and a panel, the method comprising the steps of:
   preparing a mix comprising a ceramic material and a binding phase,
      wherein the ceramic material comprises sand in a quantity not greater than 60% by dried volume of the mix and the sand comprises a grain size of less than 2.5 mm, and
      wherein the binding phase comprises a ceramic powder and an additive comprising sodium silicate in the form of an aqueous solution;
   adding high-melting transparent inorganic fibers to the mix, wherein the high-melting transparent inorganic fibers comprise a quantity of at least 1.1% by dried volume of the mix;
   depositing a first layer of the mix inside a forming mould;
   placing wires in one of a random arrangement and a preformed mesh network on the first layer, wherein the wires comprise one of a stainless steel and a metal alloy that at the high baking temperatures do not oxidize, wherein the wires comprise a length of about 20 mm and a diameter of about 0.6 mm;
   depositing a second layer of the mix inside the forming mould on the wires and the first layer;
   vacuum vibrocompacting the mix;
   drying and baking the mix.

* * * * *